(12) United States Patent
Lin

(10) Patent No.: US 8,458,410 B2
(45) Date of Patent: Jun. 4, 2013

(54) INTEGRATED CIRCUIT FOR EXECUTING EXTERNAL PROGRAM CODES AND METHOD THEREOF

(75) Inventor: Jhang-Liang Lin, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 170 days.

(21) Appl. No.: 13/220,242

(22) Filed: Aug. 29, 2011

(65) Prior Publication Data

US 2012/0059982 A1 Mar. 8, 2012

(30) Foreign Application Priority Data

Sep. 2, 2010 (TW) .............................. 99129570 A

(51) Int. Cl.
*G06F 12/00* (2006.01)
(52) U.S. Cl.
USPC ............ 711/147; 711/103; 711/104; 711/173
(58) Field of Classification Search
None
See application file for complete search history.

(56) References Cited

U.S. PATENT DOCUMENTS

| | | | |
|---|---|---|---|
| 2004/0111574 A1* | 6/2004 | Pina et al. | 711/159 |
| 2005/0055515 A1* | 3/2005 | Greicar | 711/154 |
| 2007/0255923 A1* | 11/2007 | Greicar | 711/171 |

* cited by examiner

*Primary Examiner* — Than Nguyen
(74) *Attorney, Agent, or Firm* — Birch, Stewart, Kolasch & Birch, LLP

(57) ABSTRACT

An integrated circuit for executing external program codes comprises a processor, a read only memory for storing program codes of a first routine and a second routine, and a random access memory comprising a first memory block and a second memory block. The processor executes the first routine and uses a plurality of first memory units in the first memory block for accessing data. The processor executes the second routine and uses a plurality of second memory units in the first memory block for accessing data. The first and second memory units comprise one or more common memory units. The processor executes a third routine stored in an external read only memory and accesses the data of the third routine in the second memory block.

20 Claims, 4 Drawing Sheets

INTEGRATED CIRCUIT FOR EXECUTING EXTERNAL PROGRAM CODES AND METHOD THEREOF

CROSS-REFERENCE TO RELATED APPLICATIONS

This application claims the benefit of priority to Taiwanese Patent Application No. 099129570, filed on Sep. 2, 2010, the entirety of which is incorporated herein by reference for all purposes.

BACKGROUND

The present disclosure generally relates to integrated circuits, and more particularly, to integrated circuits for executing external programs codes.

Integrated circuit designers often choose processors and application specific integrated circuits (ASIC) for different design considerations in the product development process, for example, performance, flexibility, time to market. Generally speaking, ASIC are designed to perform only specific functions and possess a better performance than processors. On the other hand, processors may perform more diversified functions by modifying the firmware or software and keeping the hardware unchanged. Therefore, processors provide the designers a shorter product development cycle and more flexibility.

Processors are also known as microprocessors, controllers, micro-controllers, etc. Processors may load program codes from non-volatile memories and execute the loaded program codes for performing certain functions. The non-volatile memory, e.g., read only memory (ROM) and flash memory, may be built in the processor for storing the program codes. When the product functions need to be modified or supplemented, the programs code, i.e., the stored content of the non-volatile memory, should be modified or supplemented. New masks may be needed for modifying the non-volatile memories built in the processors, and therefore consume lots of money and elongate the development time.

Alternatively, the modified or supplemented program codes are stored in the external non-volatile memory. The processor may load and execute the program codes stored both in the internal non-volatile memory and in the external memory. The designers may modify or supplement the programs codes with more flexibility and lower cost. Therefore, the collaboration among different designers may be easily achieved and the product development may be expedited.

Moreover, some processors support the data overlay function (also known as the memory sharing function) so that different routines may share the same random access memory (RAM) and the requirement for RAM may be lowered. For example, routines A and B need 30 and 20 memory units in the RAM for accessing (reading and/or writing) data, respectively. When the processors do not support the data overlay function, 50 memory units are needed even if routines A and B are not executed concurrently. On the contrary, when the processors support the data overlay function, 30 memory units may be enough if routines A and B are not executed concurrently. Routines are also known as sub-routine, programs, sub-programs, processes, etc. The memory unit may be bit, byte, word, or other suitable memory size.

When using the processors with data overlay function to execute the program codes stored in the external non-volatile memory, routine scheduling and RAM allocation should be carefully designed to prevent the routines from accessing the wrong data and causing erroneous result. For example, the designer may substitute the routine A above with a routine C stored in the external memory, and the routine C, however, needs 40 memory units for accessing data. Suppose that the N to N+29 memory units and the N+30 to N+45 memory units in the RAM are assigned to routine A and D, respectively. Besides, the routines A and D may be executed concurrently. If the designer substitutes the routine A with the routine C directly, the routine C will use the N to N+39 memory units in the RAM for accessing data. The routines C and D, therefore, may access the same memory units, i.e., the N+30 to N+39 memory units and cause erroneous result.

Therefore, the integrated circuit designers need an easier approach for dealing with the modification and supplement of the program codes for the processors with the data overlay function.

SUMMARY

In view of the foregoing, it is appreciated that a substantial need exists for integrated circuits for executing external program codes and method thereof to mitigate the problems mentioned above.

An example embodiment of an integrated circuit for executing external program codes, comprising: a read-only memory, for storing program codes of a first routine and a second routine; a random access memory, comprising a first memory block and a second memory block; and a processor for executing the program codes of the first routine and accesses data in a plurality of first memory units in the first memory block, and executing the program codes of the second routine and accesses data in a plurality of second memory units in the first memory block, wherein the first memory units and the second memory units comprise at least one common memory unit, and the processor executes program codes of a third routine from an external read only memory and accesses data in the second memory block.

An example embodiment of a method of executing external program codes with an integrated circuit, comprising: executing program codes of a first routine stored in a first read only memory with a processor and accessing data in a plurality of first memory units in the first memory block in the random access memory; executing program codes of a second routine stored in the first read only memory with the processor and accessing data in a plurality of second memory units in the first memory block in the random access memory; executing program codes of a third routine stored in a second read only memory with the processor and accessing data in the second memory block in the random access memory; wherein the processor, the first read only memory, and the random access memory are configured in the integrated circuit, the second read only memory is configured outside the integrated circuit, and the first memory units and the second memory units comprise at least one common memory unit.

It is understood that both the foregoing general description and the following detailed description are exemplary and explanatory only and are not restrictive of the invention, as claimed.

DETAILED DESCRIPTION

Reference will be made in detail to exemplary embodiments of the disclosure, which are illustrated in the accompanying drawings. The same reference numbers may be used throughout the drawings to refer to the same or like parts or operations.

Certain terms are used throughout the description and following claims to refer to particular components. As one skilled in the art will appreciate, a component may be referred to as different names. This disclosure does not intend to distinguish between components that differ in name but not in function. In the following description and in the claims, the terms "include" and "comprise" are used in an open-ended fashion, and thus should be interpreted to mean "include, but not limited to . . . ." The phrase "coupled with" is intended to compass any direct or indirect connection. Accordingly, if this disclosure mentioned that a first device is coupled with a second device, it means that the first device may be directly or indirectly connected to the second device through an electrical connection, wireless communications, optical communications, or other signal connections with/without other intermediate devices or connection means.

Figure 1:
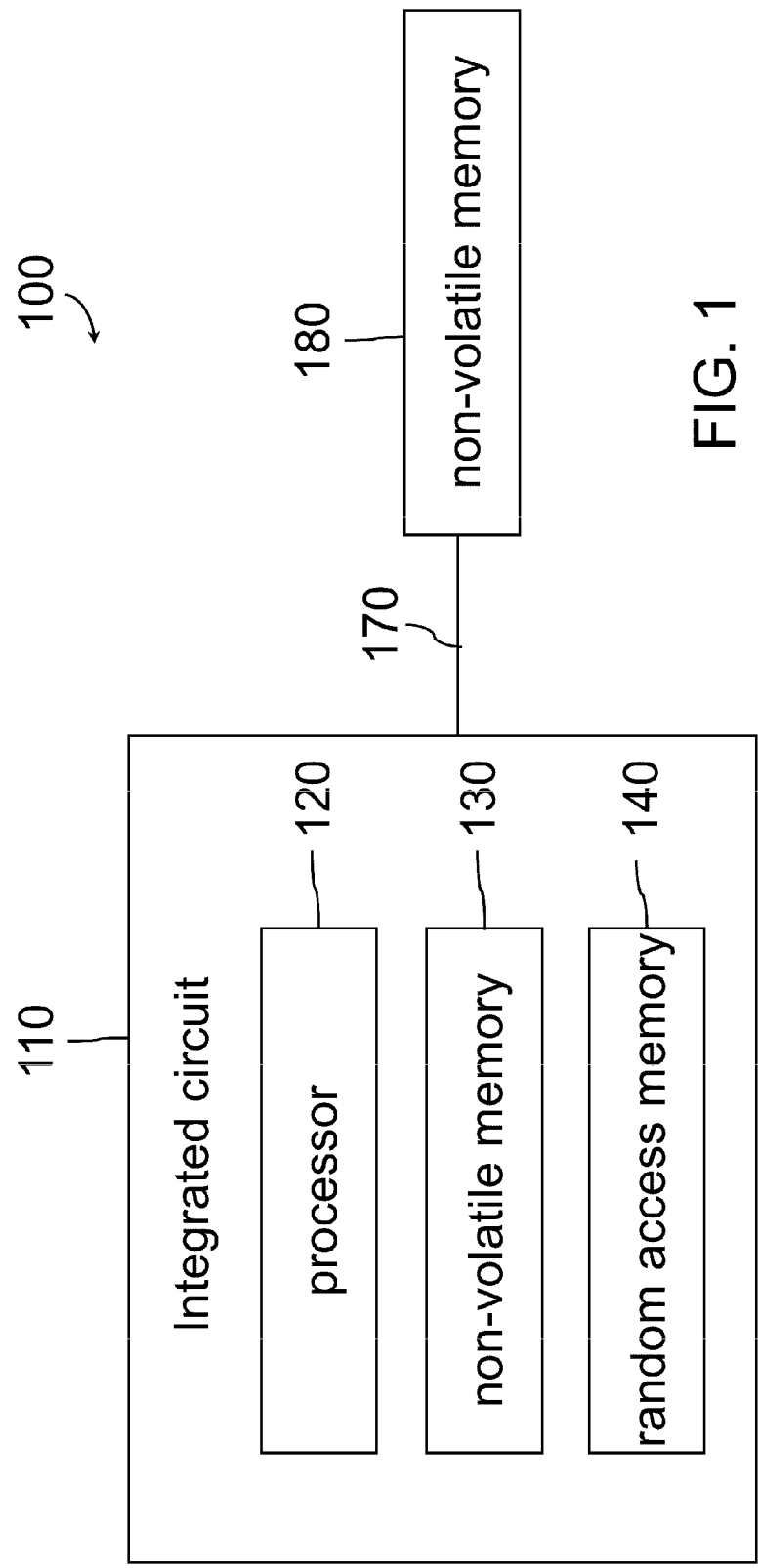
FIG. 1 shows a simplified block diagram of an example hardware system with an integrated circuit and an external non-volatile memory.

FIG. 1 shows a simplified block diagram of an example hardware system 100. The hardware system 100 comprises an integrated circuit 110, a transmission line 170, and a non-volatile memory 180.

The integrated circuit 110 comprises a processor 120, a non-volatile memory 130, and a random access memory 140. The processor 120 supports the data overlay function and may be realized with any suitable structure, e.g., reduced instruction set computing (RISC) processors and complex instruction set computing (CISC) processor. In some embodiments, the processor 120 may be chosen from the M8051 series processors or the 80390 series processors.

The non-volatile memory 130 may be realized with flash memories, erasable ROM, or non-erasable ROM for storing program codes. Program codes may be stored in the form of source codes, assembly codes, executable codes, etc.

The random access memory 130 may be realized with SRAM, DRAM, or other types of random access memory. When the processor 120 executes the routines, the random access memory 130 is used to stored data.

The non-volatile memory 180 may also be realized with flash memories, erasable ROM, non-erasable ROM, non-volatile memories in another integrated circuit, or any suitable types of non-volatile memory. The integrated circuit 110 and the non-volatile memory 180 may be configured on the same circuit board or on different circuit boards.

In contrast to the non-volatile memory 130, the non-volatile memory 180 is an external component to the integrated circuit 110 and may be coupled with the integrated circuit 110 in any suitable way. For example, the integrated circuit 110 and the non-volatile memory 180 may be fabricated as different dies and packaged separately or package in a single package.

The non-volatile memory 180 is used to store the modified and/or supplemented program codes. The processor 120 may executes the program codes in the non-volatile memory 130 and 180 for performing the designated functions.

The integrated circuit 110 and the non-volatile memory 180 are coupled by the transmission line 170 and communicated with any suitable protocol. A single line is used to represent the transmission line 170 for conciseness in FIG. 1. In other embodiments, the transmission line 170 may comprise multiple transmission lines for coupling between the integrated circuit 110 and the non-volatile memory 180.

Figure 2:
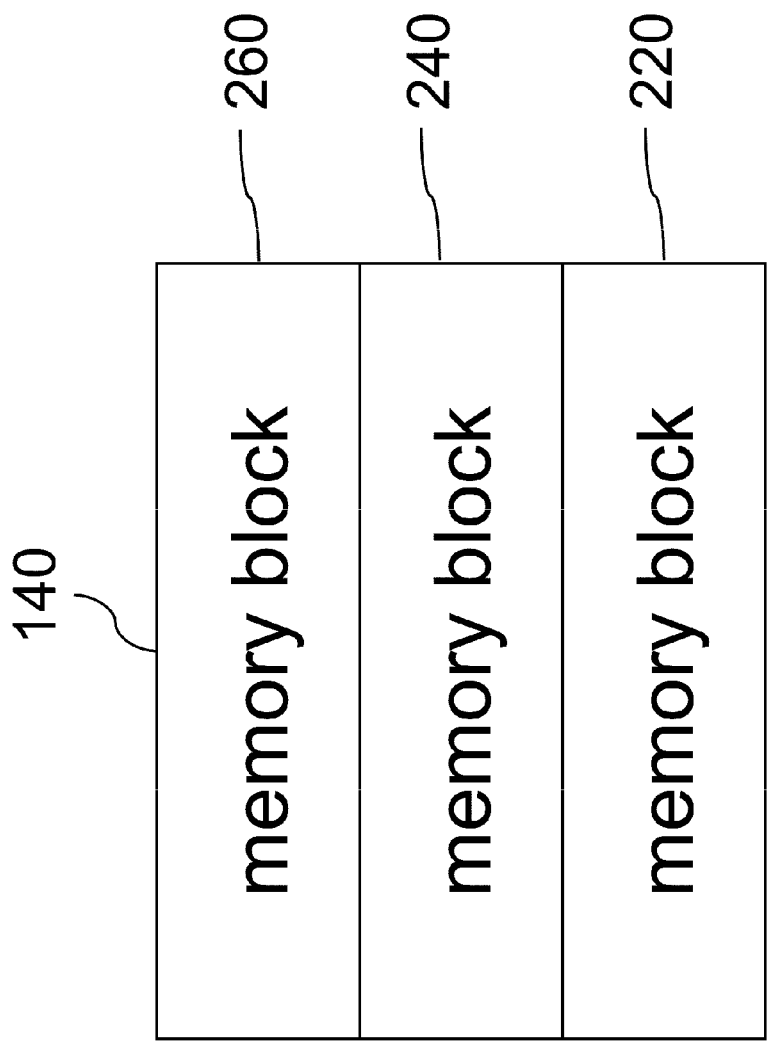
FIG. 2 shows a simplified block diagram of the memory allocation of the random access memory in FIG. 1.

FIG. 2 shows a simplified block diagram of the memory allocation of the random access memory 140 in FIG. 1. The random access memory 140 comprises memory blocks 220, 240, and 260. The relative positions and the number of the memory blocks are illustrative only. There may be a different number of memory blocks allocated in suitable positions.

The processor 120 may use paging or other memory management scheme to access some of the memory blocks more rapidly. For example, the 80390 series processors may access the BDATA, IDATA, and PDATA memory blocks more rapidly and access the XDATA memory block comparatively slower. Thus, in some embodiments, the processor 120 may be configured to access the memory blocks 220, 240, and 260 with different speed.

Figure 3:
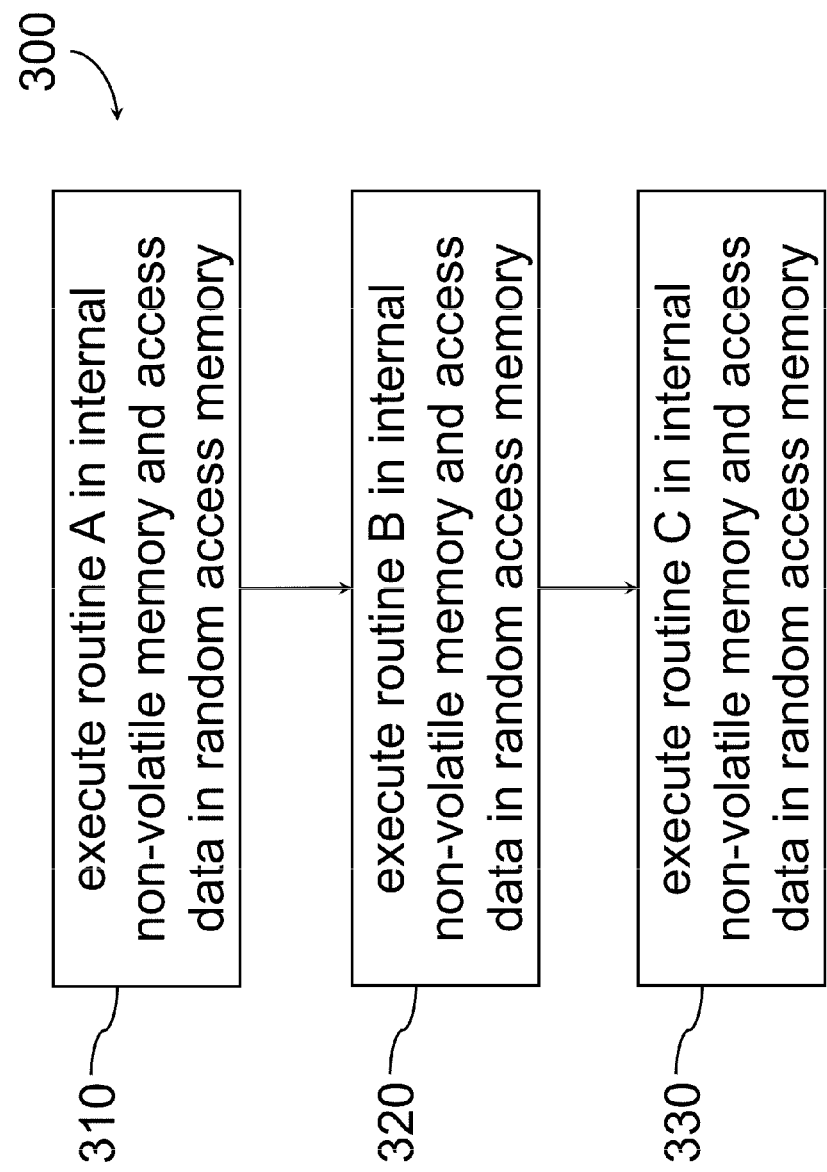
FIG. 3 shows a flowchart of an example method of executing program codes with the example hardware system in FIG. 1.

FIG. 3 shows a flowchart 300 of an example method of executing program codes with the example hardware system in FIG. 1. In this embodiment, the processor 120 only executes the program codes stored in the non-volatile memory 130.

In the operation 310, the processor 120 executes the program codes of a routine A in the non-volatile memory 130 and accesses data in the memory block 220.

In the operation 320, the processor 120 executes the program codes of a routine B in the non-volatile memory 130 and accesses data in the memory block 220. In this embodiment, the processor 120 does not execute routines A and B concurrently. The routines A and B, therefore, may share some memory units in the memory block 220. In other embodiments, the routines A and B may also be configured to access data in the memory blocks 240 and/or 260.

In the operation 330, the processor 120 executes the program codes of a routine C in the non-volatile memory 130 and accesses data in the memory block 220. In this embodiment, the routine C may be substituted by program codes stored in the non-volatile memory 180. Moreover, the routine C may store data in memory blocks 240 and/or 260 according to memory management, the accessing speed, and other design considerations.

Figure 4:
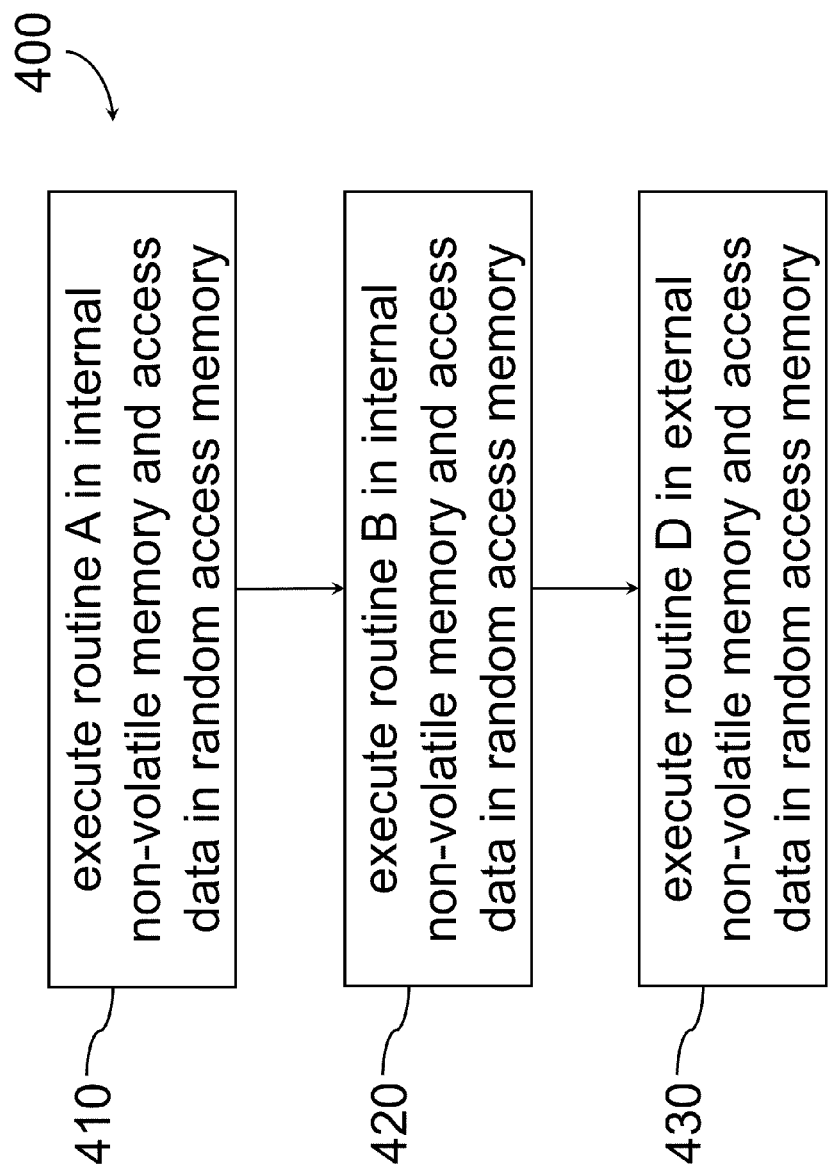
FIG. 4 shows a flowchart of another example method of executing program codes with the example hardware system in FIG. 1, all arranged in accordance with at least some embodiments of the present disclosure described herein.

FIG. 4 shows a flowchart 400 of another example method of executing program codes with the example hardware system in FIG. 1. In this embodiment, the processor 120 executes the program codes in the non-volatile memory 180 to substitute some program codes in the non-volatile memory 130.

In the operation 410, the processor 120 executes the program codes of the routine A in the non-volatile memory 130 and accesses data in the memory block 220.

In the operation 420, the processor 120 executes the program codes of the routine B in the non-volatile memory 130 and accesses data in the memory block 220. In this embodiment, the processor 120 also does not execute routines A and B concurrently. The routines A and B, therefore, may share some memory units in the memory block 220.

In the operation 430, the processor 120 executes the program codes of a routine D stored in the non-volatile memory 180 to substitute the routine C. To prevent from the memory access errors caused by the substitution of the routines C with the routine D, the routine D is configured to access data in a memory block different from the memory block, which the routine C uses to access data. For example, instead of using the memory block 220 which the routine C uses to access data, the processor 120 is configured to access data in the memory block 240 and/or 260 when executing the routine D.

In some embodiments, the routine D may be configured to access only local data in the memory block. Local data mean that the data are only valid for the routine D. In other embodiments, the routine D may be configured to access global data in the memory block. Global data mean that the data are valid for the routine D and other routines. Instead of assigning predetermined values as the initial value of the global data, the processor 120 generally copies the values stored in other memory block as the initial value of the global data in the routine D.

For example, the 80390 series processors may use the memory blocks DATA, BDATA, and/or IDATA to store local data in the routine C and use memory blocs PDATA and XDATA to store local data in routine D. In other embodiments, the memory XDATA may be used to store global data when the processor 120 executes the routine D.

In some embodiments, the routine D and other routines stored in the non-volatile memory 180 may invoke a routine E stored in the non-volatile memory 130. Memory accessing errors may occur when the routine stored in the external non-volatile memory invokes the routine E and changes the memory block in which the routine E accesses data. Thus, when a routine is designed to be executed or invoked by other routines, the routine is configured to use the designated memory units in the designated memory block by using memory shift instructions or other built-in functions. Therefore, no matter an internal routine or an external routine invokes the routine E, the routine E always accesses data in the designated memory units in the designated memory block.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An integrated circuit for executing external program codes, comprising:
   a read-only memory, for storing program codes of a first routine and a second routine;
   a random access memory, comprising a first memory block and a second memory block; and
   a processor for executing the program codes of the first routine and accesses data in a plurality of first memory units in the first memory block, and executing the program codes of the second routine and accesses data in a plurality of second memory units in the first memory block,
   wherein the first memory units and the second memory units comprise at least one common memory unit and the processor executes program codes of a third routine from an external read only memory and accesses data in the second memory block.

2. The integrated circuit of claim 1, wherein the processor accesses the first memory block more rapidly than accessing the second memory block.

3. The integrated circuit of claim 2, wherein the processor accesses only local data of the third routine in the second memory block.

4. The integrated circuit of claim 2, wherein the processor accesses global data of the third routine in the second memory block and copies values stored in the first memory block or a third memory block as the initial values of the global data.

5. The integrated circuit of claim 2, wherein the third routine invokes a fourth routine and the fourth routine accesses data in a plurality of designated memory units in the random access memory.

6. The integrated circuit of claim 1, wherein the processor accesses the second memory block more rapidly than accessing the first memory block.

7. The integrated circuit of claim 6, wherein the processor accesses only local data of the third routine in the second memory block.

8. The integrated circuit of claim 6, wherein the processor accesses global data of the third routine in the second memory block and copies values stored in the first memory block or a third memory block as the initial values of the global data.

9. The integrated circuit of claim 6, wherein the third routine invokes a fourth routine and the fourth routine accesses data in a plurality of designated memory units in the random access memory.

10. The integrated circuit of claim 1, wherein the third routine invokes a fourth routine and the fourth routine accesses data in a plurality of designated memory units in the random access memory.

11. A method of executing external program codes with an integrated circuit, comprising:
   executing program codes of a first routine stored in a first read only memory with a processor and accessing data in a plurality of first memory units in the first memory block in the random access memory;
   executing program codes of a second routine stored in the first read only memory with the processor and accessing data in a plurality of second memory units in the first memory block in the random access memory; and
   executing program codes of a third routine stored in a second read only memory with the processor and accessing data in the second memory block in the random access memory;
   wherein the processor, the first read only memory, and the random access memory are configured in the integrated circuit, the second read only memory is configured outside the integrated circuit, and the first memory units and the second memory units comprise at least one common memory unit.

12. The method of claim 11, wherein the processor accesses the first memory block more rapidly than accessing the second memory block.

13. The method of claim 12, wherein the processor accesses only local data of the third routine in the second memory block.

14. The method of claim 12, wherein the processor accesses global data of the third routine in the second memory block and copies values stored in the first memory block or a third memory block as the initial values of the global data.

15. The method of claim 12, wherein the third routine invokes a fourth routine and the fourth routine accesses data in a plurality of designated memory units in the random access memory.

16. The method of claim 11, wherein the processor accesses the second memory block more rapidly than accessing the first memory block.

17. The method of claim 16, wherein the processor accesses only local data of the third routine in the second memory block.

18. The method of claim 16, wherein the processor accesses global data of the third routine in the second memory block and copies values stored in the first memory block or a third memory block as the initial values of the global data.

19. The method of claim 16, wherein the third routine invokes a fourth routine and the fourth routine accesses data in a plurality of designated memory units in the random access memory.

20. The method of claim 11, wherein the third routine invokes a fourth routine and the fourth routine accesses data in a plurality of designated memory units in the random access memory.

* * * * *